US012600071B2

(12) United States Patent
Mitani

(10) Patent No.: US 12,600,071 B2
(45) Date of Patent: Apr. 14, 2026

(54) MOLD CLAMPING METHOD FOR AN INJECTION MOLDING MACHINE

(71) Applicant: THE JAPAN STEEL WORKS, LTD., Tokyo (JP)

(72) Inventor: Souma Mitani, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 18/212,958

(22) Filed: Jun. 22, 2023

(65) Prior Publication Data

US 2024/0001599 A1     Jan. 4, 2024

(30) Foreign Application Priority Data

Jul. 4, 2022    (JP) .................................. 2022-107501

(51) Int. Cl.
*B29C 45/76*          (2006.01)
*B29C 45/66*          (2006.01)

(52) U.S. Cl.
CPC .......... *B29C 45/7653* (2013.01); *B29C 45/66* (2013.01); *B29C 45/76* (2013.01); *B29C 2945/76013* (2013.01); *B29C 2945/7623* (2013.01); *B29C 2945/76391* (2013.01); *B29C 2945/76505* (2013.01);
(Continued)

(58) Field of Classification Search
CPC .. B29C 45/7653; B29C 45/76; B29C 2045/76
See application file for complete search history.

(56) References Cited

U.S. PATENT DOCUMENTS 4,781,872 A * 11/1988 Inaba ...................... B29C 45/66
                                                                     264/40.5
4,828,476 A * 5/1989 Yoshiharu ............... B29C 45/66
                                                                     425/150
(Continued)

FOREIGN PATENT DOCUMENTS

EP          4324619 A1 *  2/2024  ............. B29C 45/76
JP          2-273220 A      11/1990
(Continued)

OTHER PUBLICATIONS

Machine translation of KR-20160115813-A, Oct. 6, 2016 (Year: 2016).*
(Continued)

*Primary Examiner* — Benjamin A Schiffman
(74) *Attorney, Agent, or Firm* — Sughrue Mion, PLLC

(57)          ABSTRACT

A mold clamping device includes two mold platens; a ball screw mechanism connecting the mold platens to each other, the ball screw mechanism being provided with an axial force detector configured to detect an axial force acting on the ball screw mechanism; a servo motor provided on the ball screw mechanism and configured to drive the ball screw mechanism; and a control device configured to: monitor the axial force detected by the axial force detector during injection; and based on detecting an axial force increase, the axial force increase being an increase in the axial force, perform a mold clamping force increase control including driving the servo motor to increase a mold clamping force for tightening the ball screw mechanism.

6 Claims, 4 Drawing Sheets

(52) U.S. Cl.
CPC .............. *B29C 2945/76709* (2013.01); *B29C 2945/76866* (2013.01); *B29C 2945/76869* (2013.01)

(56) References Cited

U.S. PATENT DOCUMENTS

| | | | | |
|---|---|---|---|---|
| 5,756,019 A * | 5/1998 | Nakazawa | .......... | B29C 45/7653 |
| | | | | 425/149 |
| 6,561,785 B1 | 5/2003 | Morita et al. | | |
| 9,028,236 B2 * | 5/2015 | Ito | ........................ | B29C 45/7626 |
| | | | | 425/139 |
| 9,028,237 B2 * | 5/2015 | Ito | ........................ | B29C 37/0003 |
| | | | | 425/139 |
| 9,227,352 B2 * | 1/2016 | Takeuchi | ............ | B29C 45/7626 |
| 10,000,001 B2 * | 6/2018 | Lee | ........................ | B29C 45/76 |
| 10,654,205 B2 * | 5/2020 | Jebely | .................. | B29C 45/262 |
| 10,882,236 B2 * | 1/2021 | Naganuma | .......... | B29C 45/7653 |
| 11,890,796 B2 * | 2/2024 | Yoda | ........................ | B29C 45/68 |
| 2009/0243131 A1 * | 10/2009 | Tanaka | .................. | G01L 5/0076 |
| | | | | 425/149 |

| | | | | | |
|---|---|---|---|---|---|
| 2019/0299510 A1 * | 10/2019 | Jinno | ...................... | | B29C 45/68 |
| 2023/0415392 A1 * | 12/2023 | Mitani | ............... | | B29C 45/7653 |

FOREIGN PATENT DOCUMENTS

| | | | | | |
|---|---|---|---|---|---|
| JP | 5-269748 A | 10/1993 | | | |
| JP | 2001-150505 A | 6/2001 | | | |
| JP | 2001-191377 A | 7/2001 | | | |
| JP | 2003-33954 A | 2/2003 | | | |
| JP | 2006-289860 A | 10/2006 | | | |
| JP | 2012-206499 A | 10/2012 | | | |
| JP | 2016-185690 A | 10/2016 | | | |
| KR | 20160115813 A | * | 10/2016 | ......... | B29C 45/1747 |
| TW | 201331018 A | * | 8/2013 | ......... | B29C 45/7653 |
| WO | WO-2016059767 A1 | * | 4/2016 | .......... | B22D 17/263 |

OTHER PUBLICATIONS

Communication dated Jan. 28, 2026, issued by the Japanese Patent Office in Japanese Application No. 2022-107501.

* cited by examiner

MOLD CLAMPING METHOD FOR AN INJECTION MOLDING MACHINE

CROSS-REFERENCE TO RELATED APPLICATIONS

This application is based on and claims priority under 35 USC 119 from Japanese Patent Application No. 2022-107501 filed on Jul. 4, 2022, the entire content of which is incorporated herein by reference.

BACKGROUND

1. Field

The present disclosure relates to a mold clamping device including two mold platens and a ball screw mechanism connecting the mold platens; an injection molding machine; and a mold clamping method in the mold clamping device.

2. Description of Related Art

An injection molding machine or a pressing machine is provided with a mold clamping device for clamping a mold. There are various types of mold clamping devices, and JP2006-289860A discloses a mold clamping device including two mold platens. That is, the mold clamping device includes a fixed platen and a movable platen. The fixed platen and the movable platen are connected by four tie bars. Threaded portions are respectively formed on the four tie bars, and half nuts that respectively engage with the threaded portions are provided on the movable platen. Then, the movable platen is slid by an opening and closing mechanism to close molds provided on the fixed platen and the movable platen. When the half nuts are driven, the tie bars and the half nuts are engaged. That is, the movable platen is fixed to the tie bars. A hydraulic mold clamping mechanism is provided in the fixed platen and is connected to the tie bars. When hydraulic oil is supplied to the hydraulic mold clamping mechanism, the tie bars are slightly slid with respect to the fixed platen, thereby generating a mold clamping force. That is, the molds are clamped.

SUMMARY

When the molds are clamped in the mold clamping device and then an injected material is injected into the molds, a molded product is obtained. However, if the mold clamping force is not sufficient, the molds may be opened by an injection pressure, resulting in molding defects. Therefore, the molds are prevented from being opened by the injection pressure by generating a sufficient mold clamping force. However, if the mold clamping force is excessively large, the mold clamping device may be deteriorated.

Illustrative aspects of the present disclosure provide a mold clamping device which prevents deterioration caused by an excessive mold clamping force.

Other problems and novel features will become apparent from description of the present description and the accompanying drawings.

One illustrative aspect of the present disclosure provides a mold clamping device including: two mold platens; a ball screw mechanism connecting the mold platens to each other, the ball screw mechanism being provided with an axial force detector configured to detect an axial force acting on the ball screw mechanism; a servo motor provided on the ball screw mechanism and configured to drive the ball screw mechanism; and a control device. The control device is configured to: monitor the axial force detected by the axial force detector during injection; and based on detecting an axial force increase, the axial force increase being an increase in the axial force, perform a mold clamping force increase control including driving the servo motor to increase a mold clamping force for tightening the ball screw mechanism.

According to the present disclosure, deterioration of the mold clamping device can be prevented by generating a necessary and sufficient mold clamping force.

DETAILED DESCRIPTION

Figure 1:
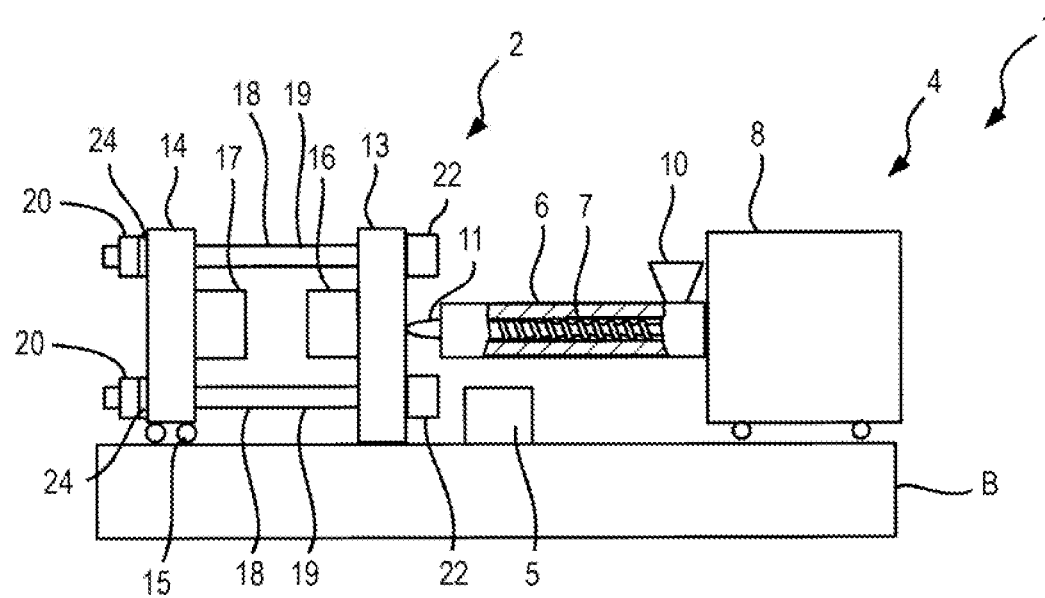
FIG. 1 is a front view showing an injection molding machine according to a first illustrative embodiment.

Hereinafter, illustrative embodiments will be described in detail with reference to the drawings. The present disclosure is not limited to the following illustrative embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

First Illustrative Embodiment

Injection Molding Machine According to First Illustrative Embodiment

As shown in FIG. 1, an injection molding machine 1 according to a first illustrative embodiment includes a mold clamping device 2 provided on a bed B, an injection device 4, and a control device 5 configured to control the mold clamping device 2 and the injection device 4.

{Injection Device}

The injection device 4 includes a heating cylinder 6, a screw 7 inserted in the heating cylinder 6, and a screw drive device 8 configured to drive the screw 7. The heating cylinder 6 is provided with a hopper 10. An injection nozzle 11 is provided at a tip end of the heating cylinder 6. When an injected material is fed from the hopper 10 and then is melted by rotating the screw 7, the injected material is metered at a tip end of the screw 7. When the screw 7 is driven in an axial direction thereof, the injected material is injected.

{Mold Clamping Device}

Figure 2:
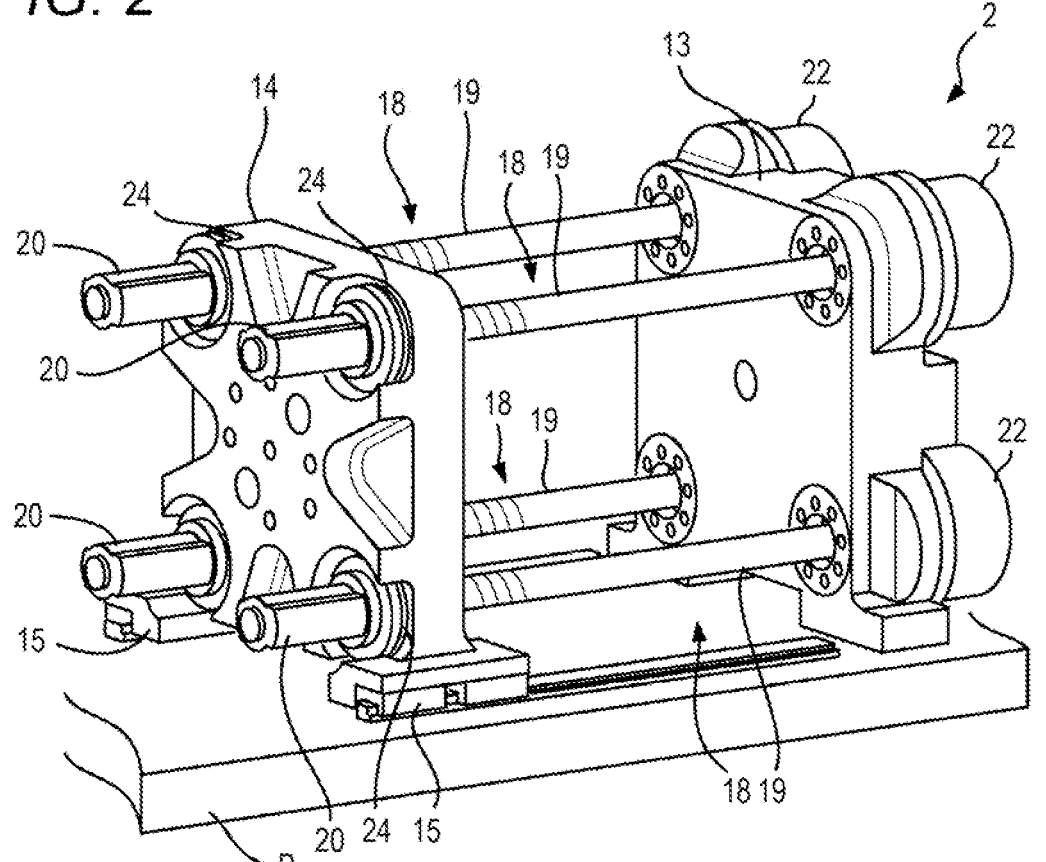
FIG. 2 is a perspective view showing a mold clamping device according to the first illustrative embodiment.

The mold clamping device 2 according to the first illustrative embodiment is a so-called two-platen mold clamping device. That is, as shown in FIG. 2, the mold clamping device 2 includes two mold platens 13, 14, that is, the fixed platen 13 and the movable platen 14. The fixed platen 13 is fixed on the bed B. The movable platen 14 is placed on linear guides 15, 15 provided on the bed B. That is, the movable platen 14 is slidable in directions approaching and separating from the fixed platen 13. As shown in FIG. 1, a fixed-side mold 16 is attached to the fixed platen 13, and a movable-side mold 17 is attached to the movable platen 14.

In the mold clamping device 2 according to the first illustrative embodiment, the two mold platens 13, 14, that is, the fixed platen 13 and the movable platen 14 are connected by four ball screw mechanisms 18, 18, . . . . The ball screw mechanisms 18, 18, . . . include ball screws 19, 19, . . . and ball nuts 20, 20, . . . attached to the ball screws 19, 19, . . . , respectively.

Although not shown in FIG. 2, through holes are formed in the movable platen 14, and the ball nuts 20, 20, . . . are fixed to the respective through holes. That is, one ends of the ball screws 19, 19, . . . are connected to the movable platen 14 via the ball nuts 20, 20, . . . , respectively. The other ends of the ball screws 19, 19, . . . penetrate the fixed platen 13 and are rotatably supported with respect to the fixed platen 13. Servo motors 22, 22, . . . are provided on the fixed platen 13 and are connected to the ball screws 19, 19, . . . , respectively. Therefore, when the servo motors 22, 22 . . . are driven, the ball screws 19, 19 . . . rotate, and the movable platen 14 slides. That is, the molds 16, 17 (see FIG. 1) are opened and closed.

{Axial Force Detector}

In the mold clamping device 2 according to the first illustrative embodiment, each of the ball screw mechanisms 18, 18, . . . is provided with an axial force detector configured to detect an axial force acting on the ball screw mechanism 18. Specifically, load cells 24, 24, . . . are respectively provided between the movable platen 14 and the ball nuts 20, 20, . . . . During mold clamping, an axial force acts on each of the ball screw mechanisms 18, 18, . . . . The axial force detector can also be said to be means for detecting a mold clamping force.

The servo motors 22, 22, . . . and the load cells 24, 24, . . . are connected to the control device 5 (see FIG. 1). In a mold clamping method according to the present illustrative embodiment, which will be described later, in an injection step, the control device 5 monitors a change in the axial forces by the load cells 24, 24, . . . , that is, by the axial force detector, and is configured to drive the servo motors 22, 22, . . . .

{Operation of Mold Clamping Device in Injection Step}

Figure 3A:
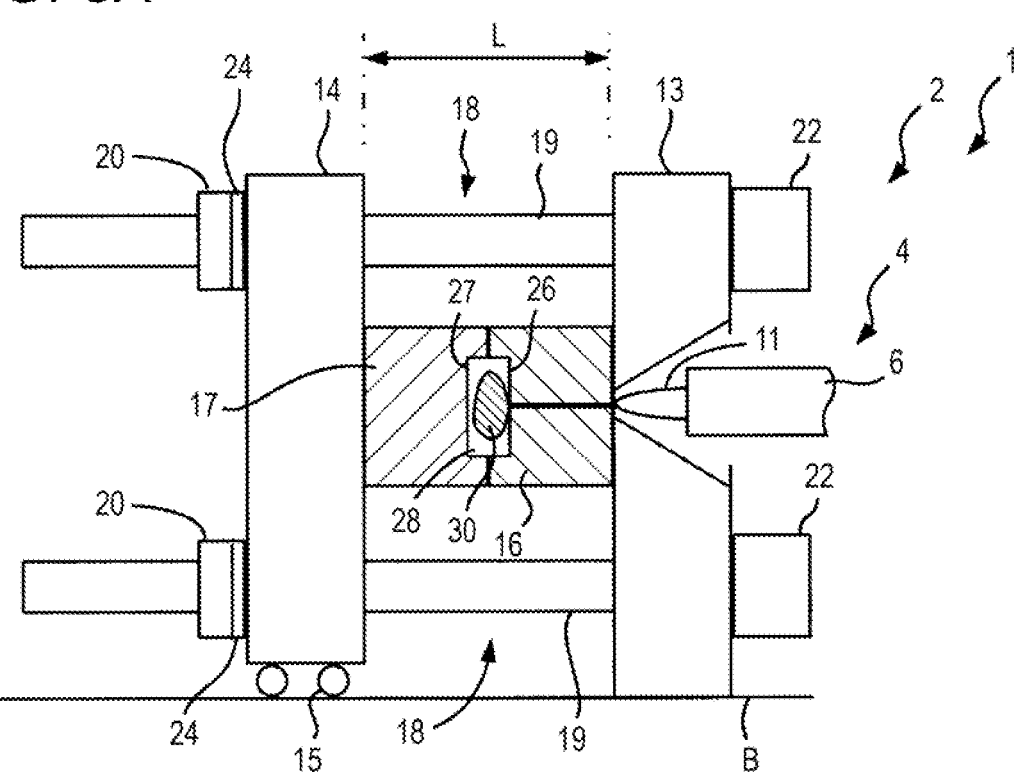
FIG. 3A is a front view showing a part of the injection molding machine according to the first illustrative embodiment during injection molding.

An operation of the mold clamping device 2 when the injection step of injecting the injected material is performed will be described with reference to FIGS. 3A and 3B. As shown in FIG. 3A, recess portions 26, 27 are formed in parting lines of the molds 16, 17, respectively, and a cavity 28 is formed when the molds are clamped. When the injected material is injected from the injection device 4 in a state where the molds are clamped, the cavity 28 is filled with a resin 30. Due to a pressure of the resin 30 injected into the cavity 28, that is, an injection pressure, a force in an opening direction acts on the molds 16, 17. This force is given by a product of the injection pressure and a pressure receiving area which is a projected area of the cavity 28. In a case where the mold clamping force in the mold clamping device 2 is sufficiently large, the molds 16, 17 are not opened in the injection step. Thus, the ball screws 19, 19, . . . are not stretched in the injection step. That is, the axial forces detected by the load cells 24, 24, . . . do not change.

Figure 3B:
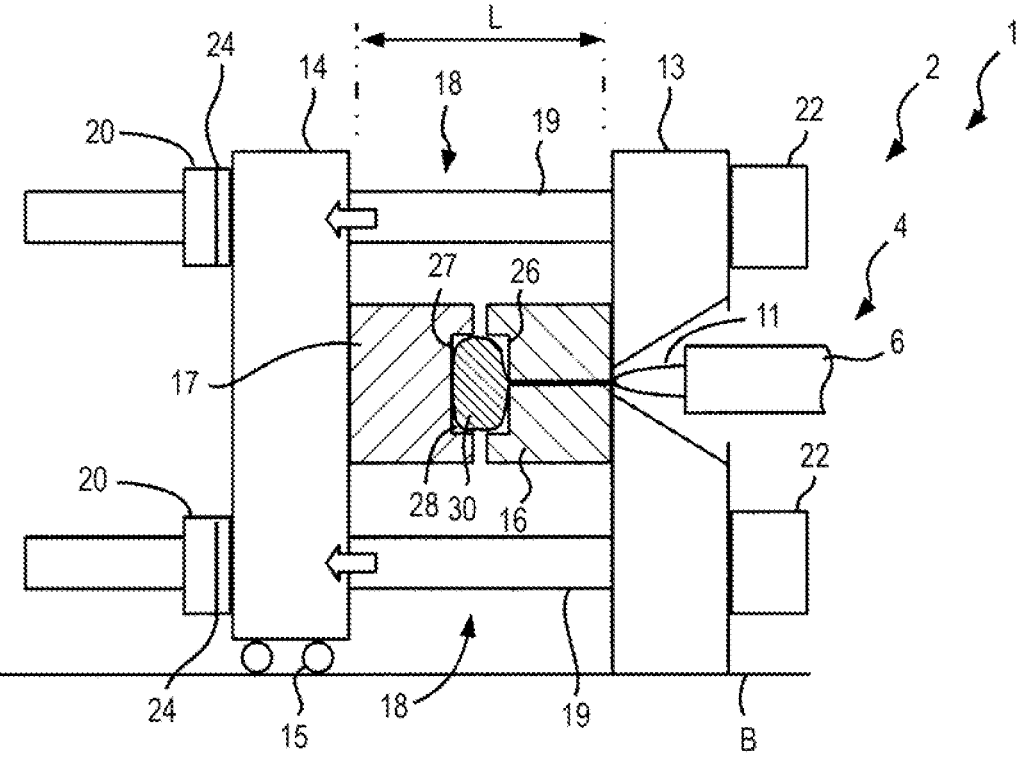
FIG. 3B is a front view showing a part of the injection molding machine according to the first illustrative embodiment during injection molding.

On the other hand, in a case where the mold clamping force is relatively small, as shown in FIG. 3B, the molds 16, 17 are slightly opened by the injection pressure of the resin

30. Thus, the ball screws 19, 19, . . . are slightly stretched. Due to the stretch, an increase in the axial forces is detected in the load cells 24, 24, . . . .

Mold Clamping Method According to Present Illustrative Embodiment

Figure 4:
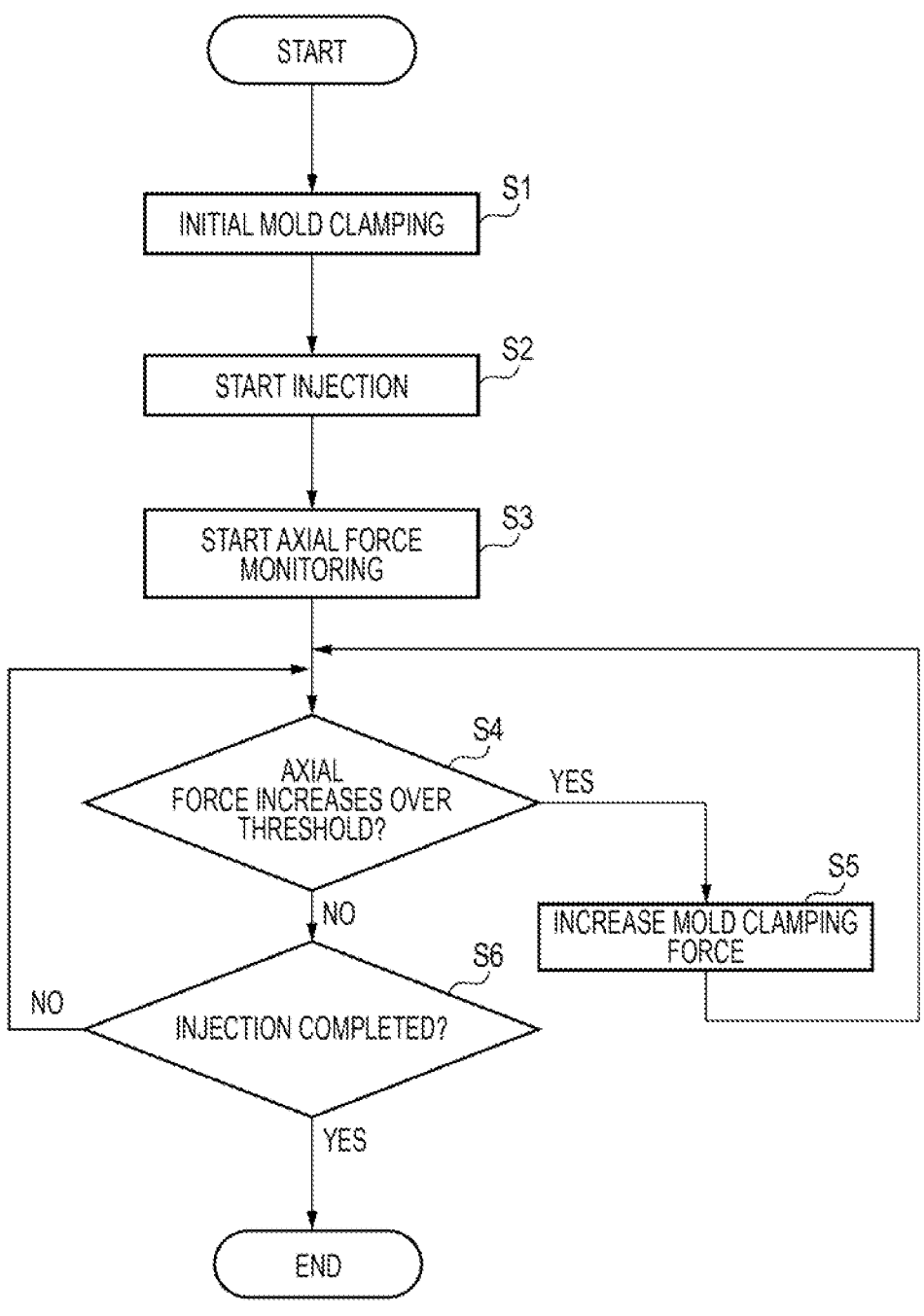
FIG. 4 is a flowchart showing a mold clamping method according to the present illustrative embodiment.

The mold clamping method according to the present illustrative embodiment will be described. The control device 5 (see FIG. 1) performs initial mold clamping in step S01 as shown in FIG. 4. That is, in the mold clamping device 2 (see FIGS. 1 and 2), the servo motors 22, 22, . . . are driven to rotate the ball screws 19, 19, . . . . Then, the molds 16, 17 come into contact with each other, and a predetermined mold clamping force is generated. In the present illustrative embodiment, the mold clamping force generated in the initial mold clamping is set to be slightly smaller than the product of the pressure receiving area which is the projected area of the cavity 28 (see FIG. 3A), and the injection pressure in the injection step.

As shown in FIG. 4, the control device 5 starts the injection step in step S02. That is, the screw 7 is driven in the axial direction in the injection device 4 (see FIG. 1). The control device 5 performs step S03 to start monitoring of the axial forces detected by the load cells 24, 24, . . . . A threshold necessary for monitoring the axial forces is set in advance in the control device 5. Thereafter, the change in the axial force is monitored.

In step S04, the control device 5 determines whether the axial force increases over the threshold. When it is determined in step S04 that the axial force increases over the threshold (YES), step S05 is performed. That is, a mold clamping force increase step is performed. Specifically, for the ball screw mechanisms 18, 18, . . . in each of which an axial force increase which is an increase in the axial force is detected, the corresponding servo motors 22, 22, . . . are driven. That is, the ball screw mechanisms 18, 18, . . . are tightened. This prevents the molds 16, 17 (see FIGS. 3A and 3B) from being opened. A preferred driving amount of each of the servo motors 22, 22, . . . that are driven at this time will be described in detail later. After performing step S05, the process returns to step S04. That is, whether an axial force increase occurs is monitored again.

In step S04, when it is determined that the axial force does not increase over the threshold (NO), the control device 5 (see FIG. 1) proceeds the process to step S06. In step S06, it is checked whether the injection step is completed. In a case where the injection step is not completed (NO), the process returns to step S04. In a case where the injection step is completed (YES), the process ends.

{Preferred Driving Amount of Servo Motor in Step S05}

When the servo motors 22, 22, . . . are driven in step S05, it is preferable to tighten each of the ball screw mechanisms 18, 18, . . . by the same length as a stretch amount generated in each of the ball screws 19, 19, . . . during injection as shown in FIG. 3B. The reason for this is that it will be the minimum drive required to prevent the molds 16, 17 from being opened. A stretch amount $\Delta L$ generated in each of the ball screws 19, 19, . . . during the injection can be calculated, based on an amount of increase $\Delta F$ in the axial force, an effective length L (see FIGS. 3A and 3B) of each of the ball screws 19, 19, . . . , a cross-sectional area S of each of the ball screws 19, 19, . . . , and Young's modulus E of each of the ball screws 19, 19, . . . , as follows.

$$\Delta L = \Delta F \cdot L / (S \cdot E) \qquad \text{(Formula 1)}$$

That is, the servo motors 22, 22, . . . may be driven to tighten the respective ball screw mechanisms 18, 18, . . . by the stretch amount ΔL. In Formula 1, 1/(S·E) is a constant value, and the driving amount of each of the servo motors 22, 22, . . . can be set to an amount obtained by multiplying the amount of increase ΔF in the axial force, the effective length L of each of the ball screws 19, 19, . . . and a coefficient.

Second Illustrative Embodiment

Injection Molding Machine According to Second Illustrative Embodiment

Figure 5:
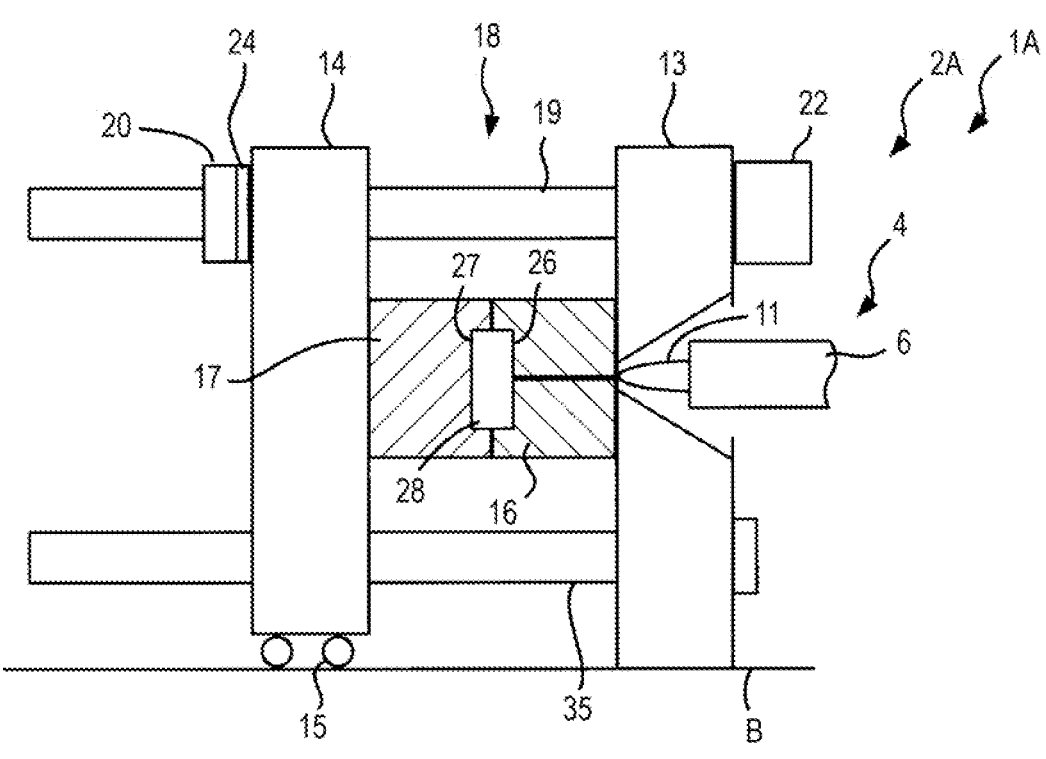
FIG. 5 is a front view showing an injection molding machine according to a second illustrative embodiment.

As shown in FIG. 5, an injection molding machine 1A according to a second illustrative embodiment includes a mold clamping device 2A, which is provided on the bed B, and the injection device 4. Although not shown in FIG. 5, the injection molding machine 1A according to the second illustrative embodiment also includes the control device 5 as in the first illustrative embodiment shown in FIG. 1. The injection device 4 of the injection molding machine 1A according to the second illustrative embodiment is configured in the same manner as the injection device 4 of the injection molding machine 1 according to the first illustrative embodiment described with reference to FIG. 1, and the description thereof is omitted.

{Mold Clamping Device}

In the mold clamping device 2A according to the second illustrative embodiment, the fixed platen 13 and the movable platen 14 are slidably connected by three guide bars 35, 35, . . . and are connected by one ball screw mechanism 18. The one ball screw mechanism 18 includes the ball screw 19 and the ball nut 20. The ball screw mechanism 18 is provided with the servo motor 22. As in the first illustrative embodiment, the load cell 24 is provided between the ball nut 20 and the movable platen 14. That is, in the mold clamping device 2A according to the second illustrative embodiment, only one ball screw mechanism 18 configured to open and close and clamping the molds is provided, and only one load cell 24 is provided as the axial force detector.

When the injection step is performed in the mold clamping device 2A according to the second illustrative embodiment, whether the axial force increases is monitored in the load cell 24 as in the first illustrative embodiment. When the axial force increases, the servo motor 22 is driven to increase the mold clamping force for tightening the ball screw mechanism 18 as in the first illustrative embodiment.

Modification

The present illustrative embodiment can be variously modified. For example, the mold clamping method according to the present illustrative embodiment can be modified. In the mold clamping method according to the present illustrative embodiment, it has been described that the initial mold clamping is performed (see FIG. 4) to generate the mold clamping force in step S01. However, in step S01, the molds 16, 17 (see FIG. 1) may be simply closed to generate substantially no mold clamping force. When the mold clamping force is substantially zero in the initial mold clamping, immediately after the injection step is started in step S02, an increase in the axial force is detected by the load cell 24. When the increase in the axial force is detected, the mold clamping force increase step is promptly performed in step S05, so that the injection can be performed with the molds 16, 17 not being opened.

Although the invention made by the present inventor has been specifically described above based on the illustrative embodiment, it is needless to say that the present invention is not limited to the illustrative embodiment described above, and various modifications can be made without departing from the scope of the invention. A plurality of examples described above may be implemented in combination as appropriate.

What is claimed is:

1. A mold clamping method executable by in a mold clamping device, the mold clamping device comprising:
    two mold platens;
    a ball screw mechanism connecting the mold platens to each other; and
    a servo motor provided on the ball screw mechanism and configured to drive the ball screw mechanism, the ball screw mechanism being provided with an axial force detector configured to detect an axial force acting on the ball screw mechanism, the mold clamping method comprising:
clamping a mold provided in the mold clamping device to generate a mold clamping force;
monitoring a change in the axial force detected by the axial force detector during injection; and
based on detecting an axial force increase in the axial force monitoring step, the axial force increase being an increase in the axial force, increasing a mold clamping force for tightening the ball screw mechanism by driving the servo motor.

2. The mold clamping method according to claim 1, wherein in the mold clamping device, a plurality of the ball screw mechanisms connecting the mold platens to each other are provided, a plurality of the servo motors are respectively provided on the ball screw mechanisms, the axial force detector is provided for each of the plurality of ball screw mechanisms, wherein the monitoring is performed for each of the plurality of ball screw mechanisms, and wherein in the increasing of the mold clamping force, the method comprises, for one or more of the ball screw mechanisms on which the axial force increase is detected during the injection, driving the corresponding one or more of the servo motors.

3. The mold clamping method according to claim 1, wherein in the monitoring, the method comprises detecting the axial force increase by determining whether the axial force increases over a predetermined threshold.

4. The mold clamping method according to claim 1, wherein the monitoring comprises continuously monitoring the axial force throughout an entire injection process from injection start to injection completion.

5. The mold clamping method according to claim 1, wherein the monitoring comprises monitoring the axial force detected by load cells positioned between ball nuts and one of the mold platens.

6. The mold clamping method according to claim 1, wherein the monitoring is performed independently for each of a plurality of ball screw mechanisms during injection.

\* \* \* \* \*